United States Patent
Dennison (10) Patent No.: US 9,507,547 B1
(45) Date of Patent: Nov. 29, 2016

(54) SPECIAL PROCESSING INDICATORS FOR PRINT VERIFICATION SYSTEMS

(71) Applicant: Carl Michael Dennison, Firestone, CO (US)

(72) Inventor: Carl Michael Dennison, Firestone, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/739,866

(22) Filed: Jun. 15, 2015

(51) Int. Cl.
  *G06F 15/00* (2006.01)
  *G06F 3/12* (2006.01)
  *G06K 15/02* (2006.01)
  *H04N 5/225* (2006.01)
  *G06K 9/18* (2006.01)

(52) U.S. Cl.
  CPC ............ *G06F 3/121* (2013.01); *G06F 3/1282* (2013.01); *G06K 9/18* (2013.01); *G06K 15/1806* (2013.01); *G06K 15/1836* (2013.01); *H04N 5/225* (2013.01)

(58) Field of Classification Search
  CPC .................................................... G06F 3/1277
  USPC ....................................................... 358/1.15
  See application file for complete search history.

(56) References Cited

U.S. PATENT DOCUMENTS

| | | | |
|---|---|---|---|
| 6,122,075 A | 9/2000 | Yamada et al. | |
| 7,857,420 B2 | 12/2010 | Reid | |
| 8,027,061 B2 | 9/2011 | Wakahara | |
| 8,090,218 B2 | 1/2012 | Larkin et al. | |
| 8,379,247 B2 | 2/2013 | Cahill et al. | |
| 8,451,472 B2 | 5/2013 | Braudaway | |
| 8,472,073 B2 | 6/2013 | Dennison | |
| 8,854,641 B2 | 10/2014 | Hirohata et al. | |
| 2008/0187233 A1 | 8/2008 | Culbertson | |
| 2010/0245930 A1 | 9/2010 | Gross et al. | |
| 2012/0278535 A1* | 11/2012 | Yeh | G06F 12/0246 711/103 |
| 2013/0100471 A1 | 4/2013 | Hanley et al. | |
| 2014/0253936 A1* | 9/2014 | Mizuguchi | G06F 3/1211 358/1.13 |

OTHER PUBLICATIONS

Braudaway et al., Automatic Recovery of Invisible Image Watermarks from Geometrically Distorted Images, International Business Machines, Thomas J. Watson Research Center, Yorktown Heights, New York, In Security and Watermarking Contents II, vol. 3971 (2000).

U.S. Appl. No. 14/501,863.

\* cited by examiner

*Primary Examiner* — Saeid Ebrahimi Dehkord
(74) *Attorney, Agent, or Firm* — Duft Bornsen & Fettig LLP (57) ABSTRACT

Systems and methods are provided for print verification. One embodiment is a Print Verification System (PVS) that includes an imaging device which image pages of physical print media that were marked by a printer for a print job. The PVS also includes an interface that receives rasterized logical pages representing the pages of physical print media, and a controller that correlates images of the physical pages with the rasterized logical pages. The controller identifies discrepancies between images of physical pages and correlated rasterized logical pages. The controller also identifies a first mark on an image of a physical page that flags the page for special processing, identifies, in response to identifying the first mark, a second mark on the image that indicates a type of special processing for the page, and performs the indicated type of special processing upon the page at the PVS based on the second mark.

20 Claims, 10 Drawing Sheets

| HORIZONTAL POSITION | AVERAGE WARP | STANDARD DEVIATION |
|---|---|---|
| 1" | +0.2 μm | 1.1 μm |
| 2" | +6.9 μm | 0.6 μm |
| 3" | +1.1 μm | 0.1 μm |
| 4" | - 4.6 μm | 2.3 μm |
| 5" | - 0.7 μm | 0.4 μm |
| 6" | +1.0 μm | 0.6 μm |
| 7" | +2.4 μm | 0.2 μm |
| 8" | +2.4 μm | 0.1 μm |

SPECIAL PROCESSING INDICATORS FOR PRINT VERIFICATION SYSTEMS

FIELD OF THE INVENTION

The invention relates to the field of printing, and in particular, to systems that verify the printed output of a printer.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

A Print Verification System (PVS) verifies that the printed pages from a printer are error-free. Thus, a PVS may scan the marked/printed pages of a job from a production printer, and may compare each printed page to a corresponding rasterized version kept in memory. If there is a discrepancy, such as an errant droplet of ink, the PVS may identify the error and report it for handling by an operator of the printer. Users continue to desire enhancements that are capable of increasing the functionality and effectiveness of a PVS.

SUMMARY

Embodiments described herein may insert combinations of special marks onto the printed pages of a print job, to flag certain pages of the print job for special processing at a PVS. Other embodiments described herein may insert errors into separator pages of multi-document print jobs, or perform other functions such as statistical analysis of page warping found in the printed pages of a print job.

One embodiment is a Print Verification System (PVS) that includes an imaging device which images pages of physical print media that were marked by a printer for a print job. The PVS also includes an interface that receives rasterized logical pages representing the pages of physical print media, and a controller that correlates images of the physical pages with the rasterized logical pages. The controller identifies discrepancies between images of physical pages and correlated rasterized logical pages. The controller also identifies a first mark on an image of a physical page that flags the page for special processing, identifies, in response to identifying the first mark, a second mark on the image that indicates a type of special processing for the page, and performs the indicated type of special processing upon the page at the PVS based on the second mark.

Another embodiment is a printer that includes a marking engine that with multiple printheads, an interface that receives print data for a print job, multiple Raster Image Processors (RIPs), and a print controller. The print controller identifies pages of the print job for special processing at a downstream Print Verification System (PVS), inserts a first mark that flags an identified page for special processing at the PVS into print data defining the identified page, and inserts a second mark that indicates a type of special processing for the identified page at the PVS into the print data defining the identified page. The print controller also transmits the print data for the job to the PVS, and direct the printheads of the marking engine to mark physical pages of print media based on the print data, including the inserted first mark and second mark.

Another embodiment is a system that includes a printer. The printer includes a marking engine that includes multiple printheads, an interface configured to receive print data for a multi-document print job that will be delivered to a customer, multiple Raster Image Processors (RIPs), and a print controller. The print controller is able to transmit the print data to a Print Verification System (PVS), and to modify the print data by inserting defects into logical pages defining separator pages for the print job, wherein the separator pages are each placed between the documents defined by the print job, and a different set of defects is inserted into each separator page. The print controller is also able to direct the printheads of the marking engine to mark physical pages of print media based on the modified print data, to receive input from the PVS indicating locations of discrepancies detected between the logical pages and the marked physical pages of print media, to determine an amount of inserted defects that were detected by the PVS as discrepancies, and to rate an accuracy of the PVS based on the amount of inserted defects that were detected by the PVS as discrepancies.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
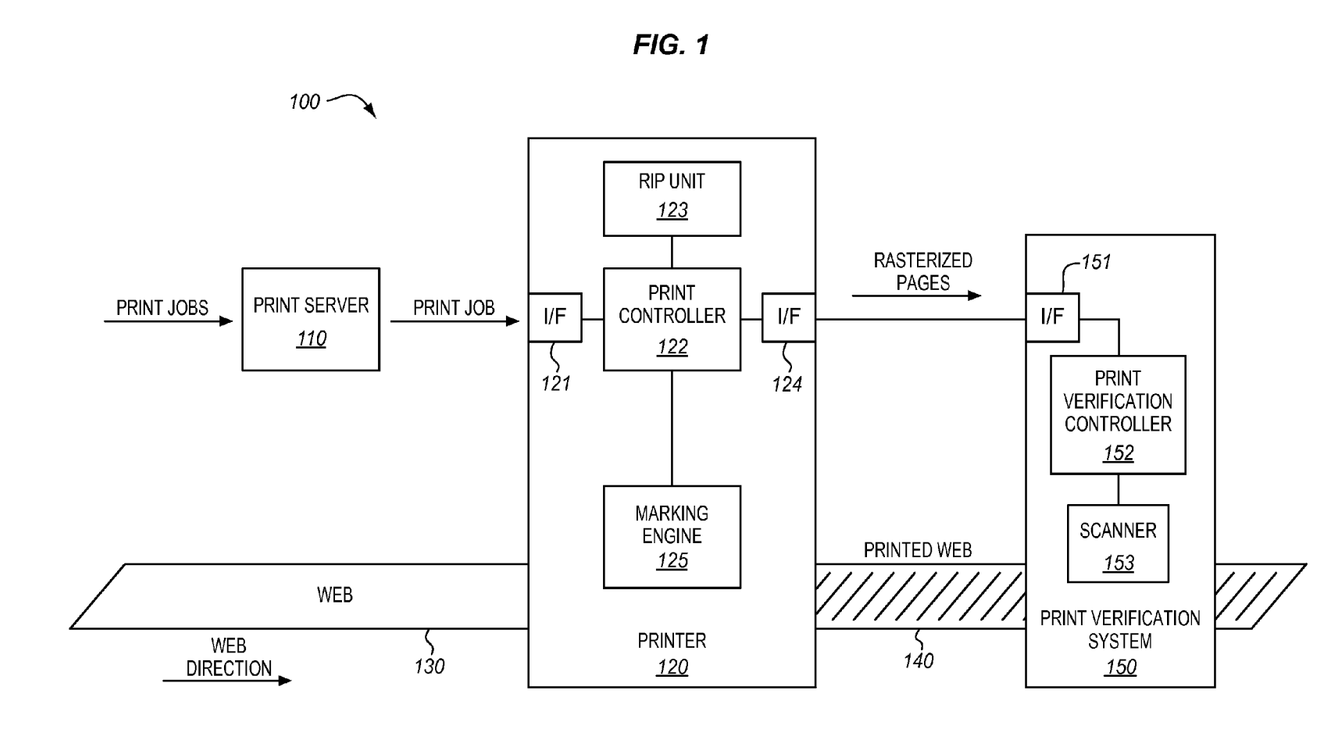
FIG. 1 is a diagram of a printing system in an exemplary embodiment.

FIG. 1 is a diagram of a printing system 100 in an exemplary embodiment. Printing system 100 is operable to mark physical pages of print media based on print data, and to detect discrepancies between the marked physical pages and the print data. For example, printing system 100 may detect printing errors caused by stray ink droplets while printing. Printing system 100 has been enhanced to insert marks into selected pages of incoming print jobs that flag the selected pages for special processing at PVS 150. This ensures that printing system 100 may customize the operation of PVS 150, based on the type of page being reviewed by PVS 150.

Printing system 100 includes print server 110, which receives print jobs from users (e.g., in a Page Description Language (PDL) format) and provides the print jobs to printer 120 for printing (e.g., in an Intelligent Printer Data Stream (IPDS) format). As used herein, PDL print data provides marking instructions at a higher level of abstraction than the bitmap level, while rasterized print data explicitly indicates the locations of individual pixels on a printed page (e.g., as a bitmap).

Printing system 100 also includes printer 120, which marks a web of print media 130 based on incoming print data for a print job, resulting in printed/marked web 140. Printer 120 also transmits a rasterized version of the print job to Print Verification System (PVS) 150. PVS 150 compares the physical pages at printed web 140 (e.g., existing on paper) to rasterized pages received from printer 120 (e.g., existing in electronic memory), and determines whether there are any discrepancies between the physical pages and their rasterized versions that indicate the existence of a printing error. This quality control process ensures that print jobs created by printer 120 are thoroughly reviewed before they are delivered to a customer.

In this embodiment, printer 120 includes interface (I/F) 121 (e.g., an Ethernet interface), which receives print data for a job from print server 110. Print controller 122 handles the overall operations of printer 120 by dividing print jobs into logical pages of PDL print data, and providing the logical pages to Raster Image Processor (RIP) unit 123 for processing. RIP unit 123 includes multiple RIPs which rasterize the logical pages. As logical pages are rasterized, print controller 122 may transmits the rasterized pages via interface 124 (e.g., an Ethernet interface) to PVS 150. Print controller 122 also directs the printheads of marking engine 125 to print each rasterized page by marking web 130.

Printer 120 has been enhanced to insert printable marks into print jobs. The marks flag individual pages of the print job for one of several different types of special processing at PVS 150. These marks may be inserted onto the logical pages of the print job such as separator pages, for example, at locations on the pages that will later be cut from the printed/marked web 140.

PVS 150 receives rasterized pages via interface 151, and PVS controller 152 analyzes the rasterized pages to facilitate the verification process for printed pages that have been scanned by scanner 153. PVS controller 152 may selectively engage in special processing of individual printed pages, based upon an analysis of the images of those printed pages. As used herein, special processing refers to any processing techniques that alter the default print verification processes performed by PVS 150 upon physical pages of print media. Controllers 122 and 152 may be implemented as custom circuitry, as processors executing programmed instructions, etc. The particular arrangement, number, and configuration of components described herein is exemplary and non-limiting. For example, the systems and methods described herein may utilize cut-sheet instead of continuous-forms printing systems.

Figure 2:
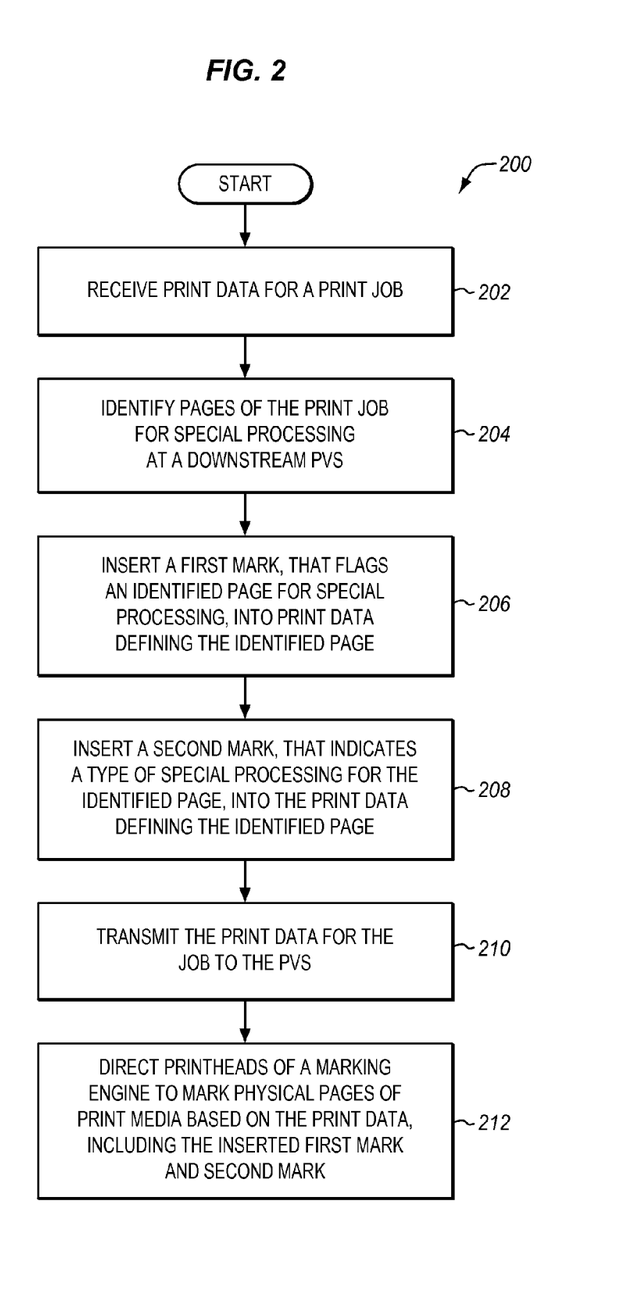
FIG. 2 is a flowchart illustrating a method for operating a printer in an exemplary embodiment.
Figure 3:
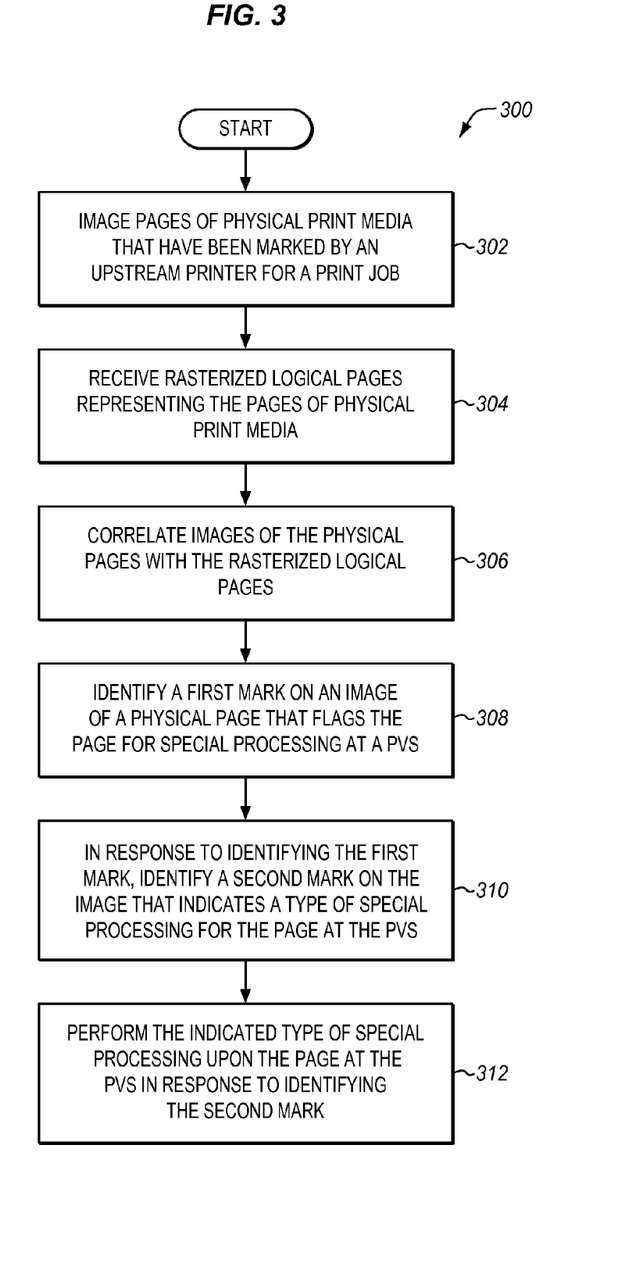
FIG. 3 is a flowchart illustrating a method for operating a PVS in an exemplary embodiment.

Illustrative details of the operation of printing system 100 will be discussed with regard to FIGS. 2-3. FIGS. 2-3 illustrate the process of operating a printer to flag pages for special processing at PVS 150, and performing special processing at PVS 150 for the pages that have been flagged for special processing. Specifically, FIG. 2 illustrates operations performed by printer 120, while FIG. 3 illustrates operations performed by PVS 150.

Assume, for this embodiment, that a user has provided a print job in a Page Description Language (PDL) format to print server 110. Print server 110 determines, based on a job ticket for the print job, that the output of the job should be verified by PVS 150. Therefore, print server 110 transmits the print job to printer 120 for printing.

FIG. 2 is a flowchart illustrating a method 200 for operating a printer in an exemplary embodiment. The steps of method 200 are described with reference to printer 120 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, I/F 121 of printer 120 receives print data for the print job. The print data may arrive in any suitable format, such as PDL (e.g., Postscript, Portable Document Format (PDF), etc.), as a print data stream, etc. After the print data has been received, print controller 122 may divide the print data into logical pages. Boundaries between logical pages may be identified by print controller 122 based on special characters or tags within the print data, may be identified based on a known size of each logical page, or any other suitable technique.

In step 204, print controller 122 identifies pages of the print job for special processing at PVS 150, which is downstream of printer 120. Instead of being processed in a default manner of verification by PVS 150, these pages will receive special processing. The pages identified by print controller 122 may be flagged by print server 110 as requiring a specific type of special processing, may be separator pages inserted into the print job by print server 110 or print controller 122, may be identified based on their contents or locations within the print job, etc.

In step 206, print controller 122 inserts a first mark into the print data defining a page for special processing. The mark flags the page for special processing at PVS 150, but may not specify the exact type of special processing to perform. The mark may comprise a custom label or picture, and may be placed on an area of the page that will later be cut from the print job, or may be placed in a location where the mark remains on the print job as delivered to the customer. For example, the mark inserted into the page may be represented by text, a barcode, a symbol, etc. In this embodiment, the print job is a multi-document print job that includes a book/document number and page number on each page. Thus, the mark inserted by print controller 122 includes a book number that is outside the range of expected book numbers for the job. This value for the book number operates as a flag that indicates the page should receive special processing at PVS 150. The mark may be inserted by print controller 122 as rasterized bitmap data or as PDL print data. Furthermore, the mark may be identified as a special processing mark based on its color, or may be applied onto the page via clear/transparent/white inks (such as those found in protectant coatings, optical brighteners, and glossing agents). These inks may even comprise ultraviolet (UV) or infrared (IR) inks.

In step 208, print controller 122 inserts another, second mark into the print data defining the page (e.g., into a logical page or rasterized logical page for the print job). The second mark indicates the type of special processing that will be performed upon the page. For example, the second mark may flag the page for enhanced verification processes, low resolution verification processes, suppression of verification, alignment of PVS camera systems, or other processing. In this embodiment, where the print job includes book numbers and page numbers for each of its pages, the second mark comprises a page number that would normally correspond with a page of a document/book. However, based on the book number acting as a flag selecting the page for special processing, the page number is instead interpreted as a command defining the type of special processing to perform at PVS 150. That is, while page number one may normally indicate a page number, when page number one is considered together with book number thirty two thousand, the page number may indicate a type of processing to perform on the page, instead of an actual number of the page within the book/document. Before or after inserting the marks as discussed in steps 206-208, print controller 122 may transmit the logical pages of print data to the multiple RIPs of RIP unit 123 for rasterization.

In step 210, print controller 122 transmits the rasterized pages of print data for the job to PVS 150. Print controller 122 further directs the printheads of marking engine 125 to print the rasterized pages onto a page of physical print media for verification in step 212. This includes pages that have inserted marks from steps 206-208 above. After PVS 150 has access to the rasterized pages of the print job, it is capable of verifying the corresponding physical pages that have been marked onto printed web 140.

Method 200 provides a benefit over prior systems, because it provides information in incoming pages that helps to facilitate print verification at PVS 150. This ensures that incoming pages of physical print media are selectively processed by PVS 150 in accordance with the wishes of an operator of the print shop.

Method 300 of FIG. 3 illustrates steps performed by PVS 150 as PVS 150 receives and processes incoming pages of physical print media. According to method 300, verification controller 152 of PVS 150 operates an imaging device (e.g., scanner 153) to image pages of physical print media that have been marked by printer 120 for a print job (step 302). This may comprise photographing/scanning each page on printed web 140 as each page travels beneath scanner 153. In step 304, verification controller 152 receives rasterized logical pages via I/F 151. The rasterized logical pages represent ideal versions of incoming physical pages of print media for the print job.

Verification controller 152 proceeds to correlate images of the physical pages with the rasterized logical pages in step 306. For example, verification controller 152 may correlate physical pages with rasterized pages based on their order of receipt, based on corresponding marks included on the rasterized pages and the physical pages, etc.

In step 308, verification controller 152 identifies a first mark on a physical page. The mark flags the page for special processing at PVS 150. For example, the mark may be identified by verification controller 152 as a mark that is uniquely different from other marks included on the image of the page, or a mark that is included at a unique location on the image of the page. The mark indicates that special processing will occur for this page at PVS 150. That is, without any other input from printer 120, the detection of the first mark at PVS 150 is sufficient for verification controller 152 to determine that special processing will be performed by PVS 150 for this page.

In step 310, in response to identifying the first mark, verification controller 152 identifies a second mark on the page that indicates a type of special processing to perform upon the page at PVS 150. For example, the special processing may include discarding the image of the page (or the page itself) after verification has been performed, may comprise performing enhanced or degraded versions of print verification, may comprise suppressing print verification entirely, or may comprise performing entirely different tasks, such as recalibrating the alignment of a camera/scanner at PVS 150 used for print verification purposes, based on the image of the page.

In step 312, verification controller 152 operates PVS 150 to perform the indicated type of special processing upon the image of the page (or the physical page itself) in response to identifying the second mark. The details of these operations are described in detail below, but involve PVS 150 altering, adjusting, or foregoing verification processes for the page.

Using method 300, a combination of two marks may be utilized in a multi-tier process to indicate not just the existence of special processing, but also the specific type of processing to perform. This technique is substantially different from using one mark to indicate both a need for special processing as well as a type of special processing, because it allows marks that are normally used for one purpose (e.g., to indicate page number) to be selectively repurposed for an entirely different use (e.g., to indicate how to specially process a page at a PVS).

Figure 4:
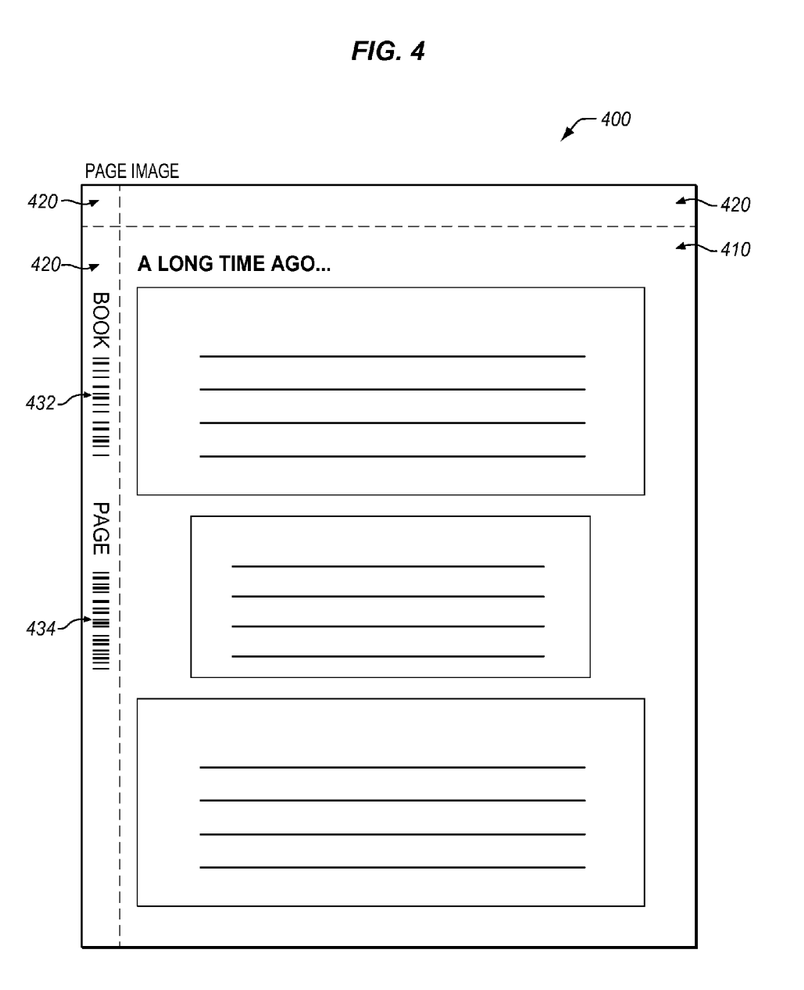
FIG. 4 is a diagram illustrating a page in an exemplary embodiment.

FIG. 4 is a diagram illustrating an image of a page 400 in an exemplary embodiment. According to FIG. 4, page 400 includes region 410, which will be delivered to a customer, and regions 420, which will be cut away from the page prior to delivery of the page to the customer, as indicated by the dashed lines on page 400. In the region 420 located on the left, two separate marks are included for analysis by PVS 150. The first mark 432 indicates a book/document number that is used within the print job to distinguish the document from other documents that have printed. The second mark 434 indicates a page number that is used within the print job to distinguish the current page of the document from other pages. In FIG. 4, when the book number is higher than/exceeds an expected maximum value (e.g., a range of document numbers actually defined for the print job, or a maximum value for number of documents per job as defined for PVS 150), then the book number no longer indicates an actual document number, and instead indicates that special processing will be performed on the current page. The page number normally indicates the current page of the document within the print job, but when the book number indicates special processing, the page number is repurposed in order to indicate the type of special processing that will be performed. Thus, the second mark 434 found on the current page no longer indicates page number at all, because it instead indicates what type of special processing to perform at PVS 150. Verification controller 152 may identify these marks based on their relative positions within the image of the page, and may read the marks as barcodes indicating a specific number.

Figure 5:
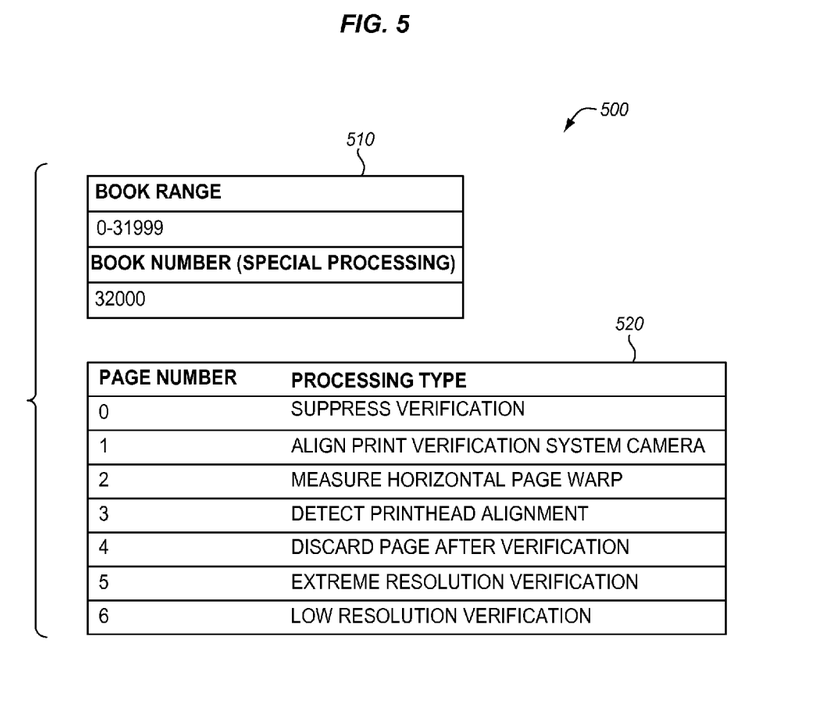
FIG. 5 is a diagram illustrating codes indicating a presence and type of special processing for a page in an exemplary embodiment.

FIG. 5 is a diagram 500 illustrating codes indicating a presence and type of special processing for a page in an exemplary embodiment. In FIG. 5, table 510 indicates book numbers which are actually used as book numbers, as well as a book number that is used as a special processing flag for a page of a multi-document print job. Table 520 indicates how, when the special processing flag is set via book number, different page numbers are used to indicate different types of special processing. In FIG. 5, the different types of special processing are suppressing/foregoing verification for the page by foregoing the identifying of discrepancies, aligning a camera of the PVS based on the page, measuring horizontal page warp for the page, detecting defects in printhead alignment on the page, discarding the page (or an image of the page from memory) after verification has been performed, performing extreme resolution verification (e.g., by searching for smaller defects than normal), or performing low resolution verification (e.g., by searching for only larger defects than normal).

Figure 6:
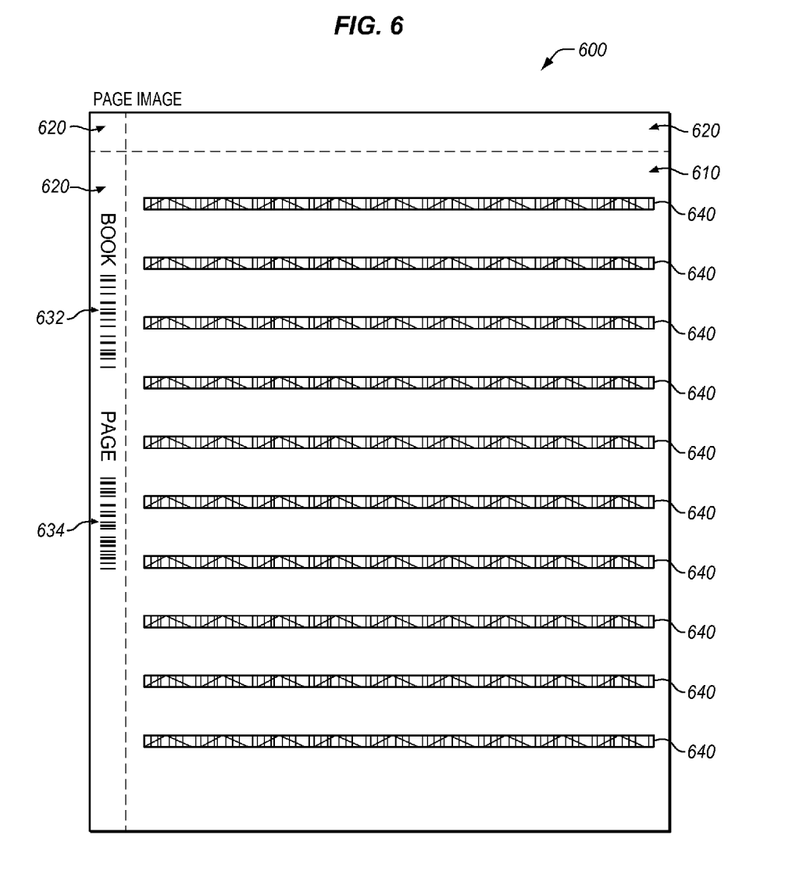
FIG. 6 is a diagram illustrating a cluster of correlation strips on a page in an exemplary embodiment.

In print verification systems, each physically printed page (and even portions thereof) may not directly align with a rasterized logical page, because the print media may become warped by inking, application of toner, drying processes, or web tension. FIG. 6 is a diagram illustrating a cluster of correlation strips on a page 600 in an exemplary embodiment, which may be used to account for this warping when performing print verification. To detect the nature and amount of variation in these warps found in a printed web over time, a large set of correlation strips 640 may be placed inside of region 610 of page 600. The strips may then be analyzed to determine an amount of average page warp (e.g., a mean, median, or mode page warp at a given horizontal page location based on measurements taken from each of correlation strips 640), as well other statistical information such as the standard deviation of page warp for a given page location. According to FIG. 6, page 600 also includes regions 620, which will be cut from the page before delivery to a customer, first mark 632 (flagging the page for special processing), and second mark 634 (indicating that horizontal page warp should be measured and statistically analyzed for this page, for later extrapolation to other pages).

Figure 7:
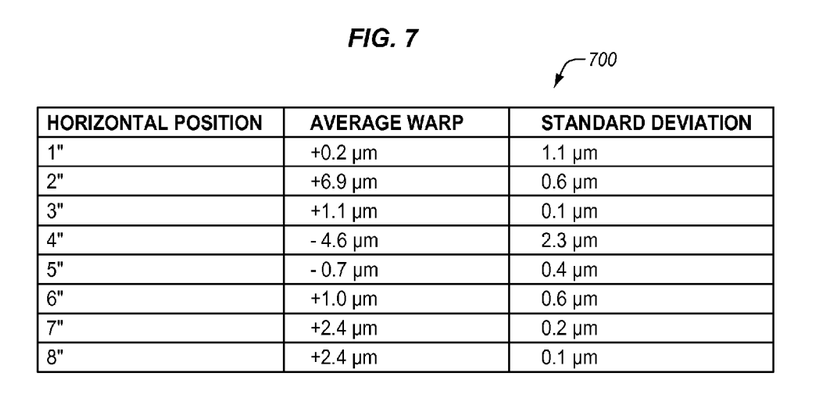
FIG. 7 is a table illustrating numeric analysis of a cluster of correlation strips on a page in an exemplary embodiment.
Figure 8:
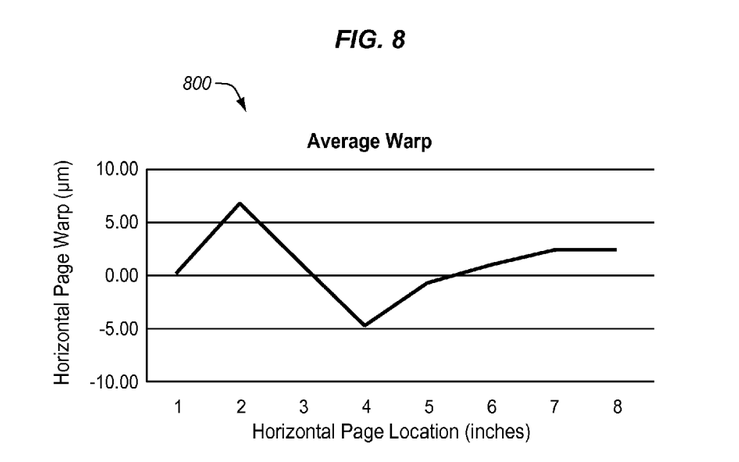
FIG. 8 is a graph illustrating the table of FIG. 7 in an exemplary embodiment.

FIG. 7 is a table 700 illustrating numeric analysis of a cluster of correlation strips on a page in an exemplary embodiment. Table 700 illustrates the average amount of horizontal warp found at each page location, as well as a standard deviation of the average amount of warp for that page location. These measurements are provided in micrometers (μm). FIG. 8 is a graph illustrating the table of FIG. 7 in an exemplary embodiment. FIG. 8 illustrates the average measured amount of horizontal warp of various horizontal page locations. When a further page is received, PVS 150 may detect an amount of page warp for the pages as indicated by a correlation strip in a header for that page. If a measured amount of page warp is substantially higher than expected based on the measurements made for page 600 (e.g., is more than three standard deviations above or below the measured average), then verification controller 152 may report this result to a print shop operator, may direct printer 120 to halt printing, or may report the presence of a potential imaging error at a scanner of the PVS.

In a further embodiment, printer 120 inserts defects into separator pages that are placed between the documents of a multi-document print job (e.g., a multi-copy print job). Each separator page may include a different/unique set of inserted defects with respect to other separator pages, placed at unique page locations and/or having unique sizes or other characteristics. Placing these defects into the separator pages of a "live" print job that will be delivered to a customer enables a print shop operator to ensure that the PVS is operating properly to detect errors, even when the PVS is processing print jobs that take hours or even days to print. Placing these defects in the separator pages between documents of the job also allows for quality control of the PVS to be performed on a document by document basis.

Figure 9:
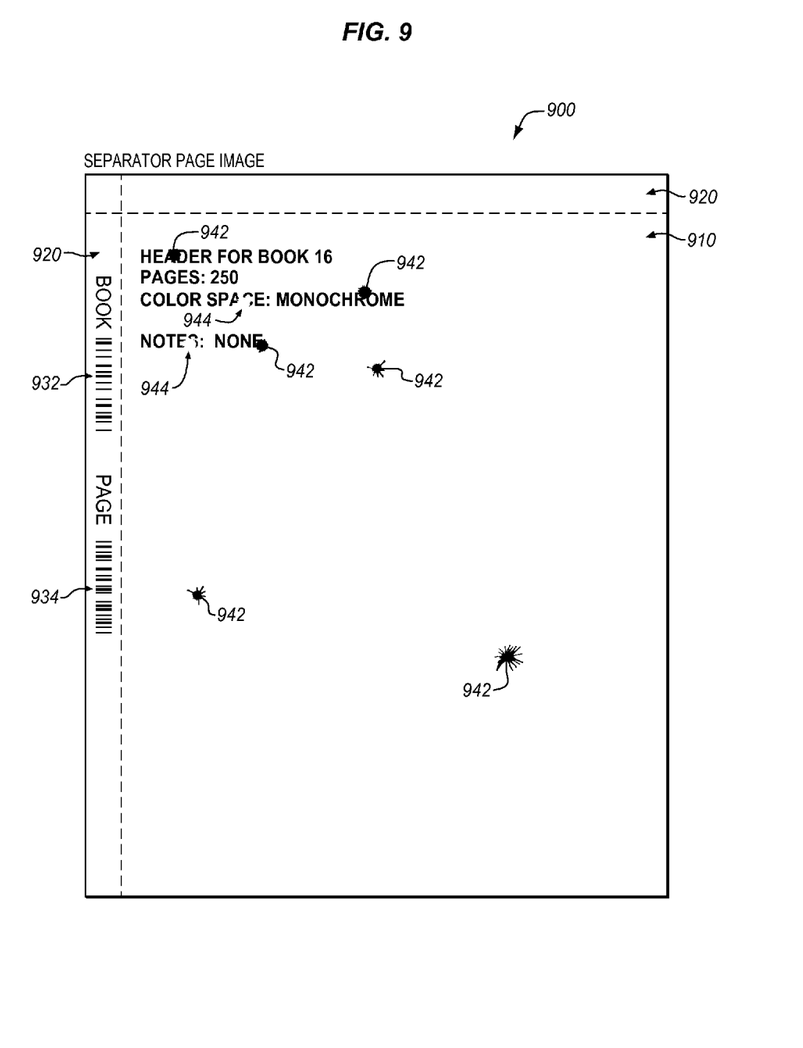
FIG. 9 is a diagram illustrating a separator page, placed between documents of a print job, which includes inserted errors in an exemplary embodiment.

FIG. 9 is a diagram illustrating a separator page 900, placed between documents of a multi-document print job, which includes inserted errors in an exemplary embodiment. According to FIG. 9, page 900 includes regions which will be cut 920, as well as a region 910 (which will not be cut). Page 900 includes defects such as inserted marks 942 that were not originally defined for the separator page, and voids 944 which are the absence of marks that were defined for printing by the separator page.

In the leftward region 920, a first mark 932 (in this case, a barcode) indicates that the page is subject to special processing. A second mark 934 indicates that the special processing will be to discard the image of the page after performing print verification. The page image will be discarded after verification because the errors on the separator page do not need to be reported to the customer as errors or otherwise shown to the customer for review. Instead, since the inserted errors do not alter the content of the printed documents themselves, the images of those pages may be removed from the memory of the PVS to free space for verifying other pages.

Figure 10:
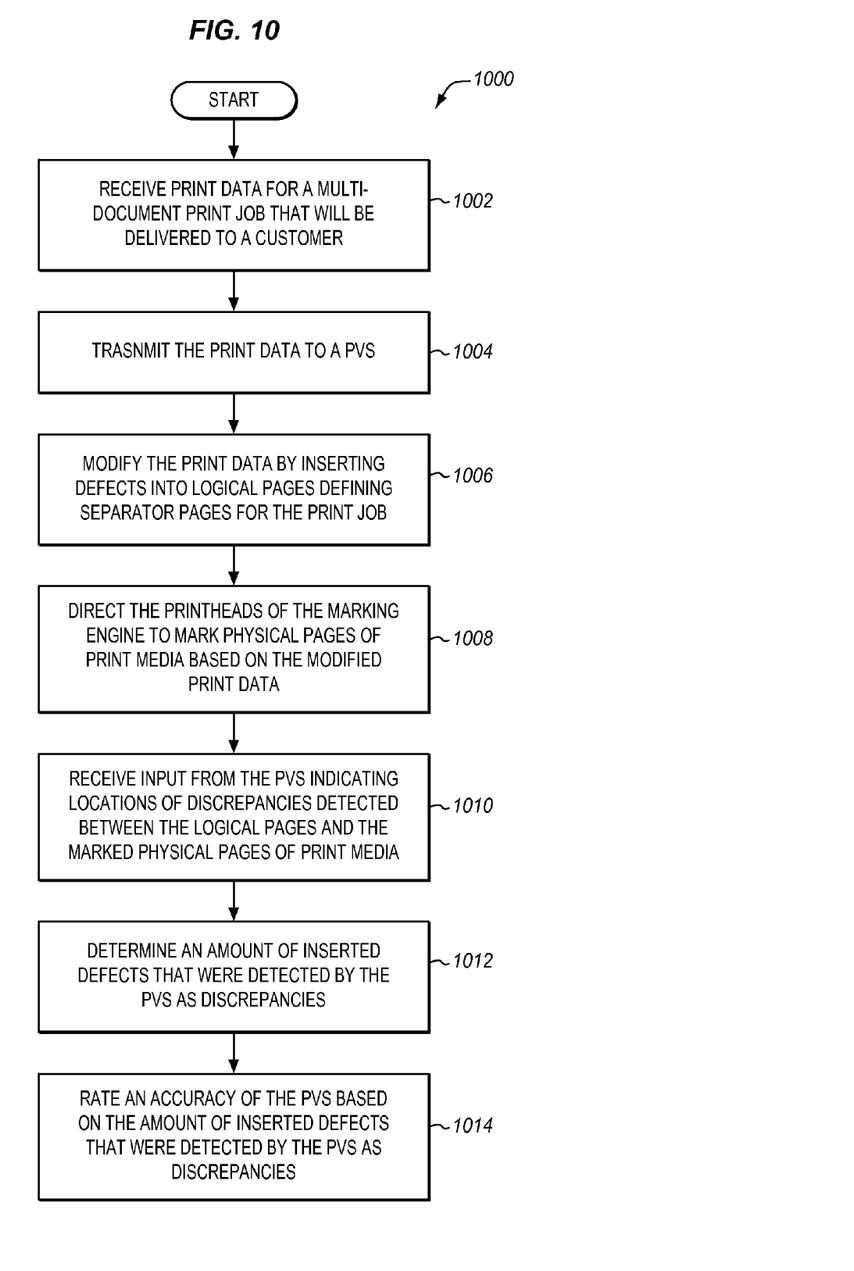
FIG. 10 is a flowchart illustrating a further method for operating a printing system in an exemplary embodiment.

FIG. 10 is a flowchart illustrating a method 1000 for operating a printing system in an exemplary embodiment. Specifically, method 1000 utilizes printer 120 to insert defects into separator pages found between the documents of a multi-document print job. In step 1002, print controller 122 receives print data for a multi-document print job from print server 110. The print job is marked for delivery to a customer, meaning that the print job is not a "test" job, but rather is a live job that will be utilized by a customer of the print shop.

Print controller 122 may further generate PDL or rasterized separator pages for the print job, or may receive the separator pages as a part of the print job. In step 1004, print controller 122 transmits the print data for the job to PVS 150. That is, print controller 122 transmits the unaltered print data for the documents (e.g., as rasterized) to PVS 150, and also transmits any separator pages for the print job that have been generated. Thus, PVS 150 expects the separator pages of the print job, as defined by the received print data, to be error-free.

In step 1006, print controller 122 modifies/alters the print data for the job by inserting defects into logical pages defining separator pages for the print job. That is, print controller 122 modifies one or more pixels defined for a separator page to change those pixels (e.g., their location, color, or very existence) and deviate them from their originally defined configuration as indicated to PVS 150. Each set of one or more contiguous pixels that are altered in this manner comprises an inserted defect for the page. Thus, inserted defects for a separator page may comprise added marks which were not defined by the original logical page, or may comprise the absence of marks which were originally defined by the logical page. Defects may be inserted as revisions to the rasterized version of the logical page, or as revisions to the PDL for the page. Each separator page that includes inserted defects may be flagged with marks indicating that the separator page shall receive special processing at PVS 150. Furthermore, each separator page may be modified to include a unique set of defects with respect to other separator pages (e.g., sets of defects that exhibit unique locations, sizes, and/or shapes).

In step 1008, print controller 122 directs printheads of marking engine 125 to mark physical pages of print media within web 140, based on the modified print data. That is, the print job, as printed, includes intentionally inserted defects (e.g., of five pixels in size or less) on the separator pages that are located between the documents. Thus, when PVS 150 reviews the physical pages of the print job, it may detect these defects, and report the detected defects back to printer 120.

In step 1010 print controller 122 receives input from PVS 150 indicating locations of discrepancies detected between the logical pages and the physical pages of print media. Based on the input describing these detected discrepancies (e.g., their location on each page and size), in step 1012 print controller 122 determines, on a separator page by separator page basis, which defects were detected by PVS 150, and what amount (e.g., number/percentage) of inserted defects were detected by PVS 150. Print controller 122 then rates an accuracy of PVS 150 (e.g., on a separator page by separator page basis) in step 1014, based on the amount of inserted defects that were detected by PVS 150. For example, this rating may indicate whether PVS 150 is operating at an expected level of quality, degraded level of quality, or exceptional level of quality based on the percentage of inserted errors detected in each separator page. This rating may apply to groups of separator pages if desired. In this manner, if PVS 150 encounters a problem which causes its verification abilities to degrade when processing a large print job, print controller 122 may detect the drop in verification quality and report the change to a print shop operator, or may even halt the print job.

In a further embodiment, print controller 122 may even rate the accuracy of PVS 150 based on the amount of defects detected by PVS 150 within each of multiple regions on the page. The detected amount of defects and/or PVS accuracy may then be added along with a recommendation (e.g., halt printing, do not halt printing, etc.) to a report, and this report may be stored at printer 120, e-mailed, or maintained at any suitable network-accessible location for review by a user or network device.

Figure 11:
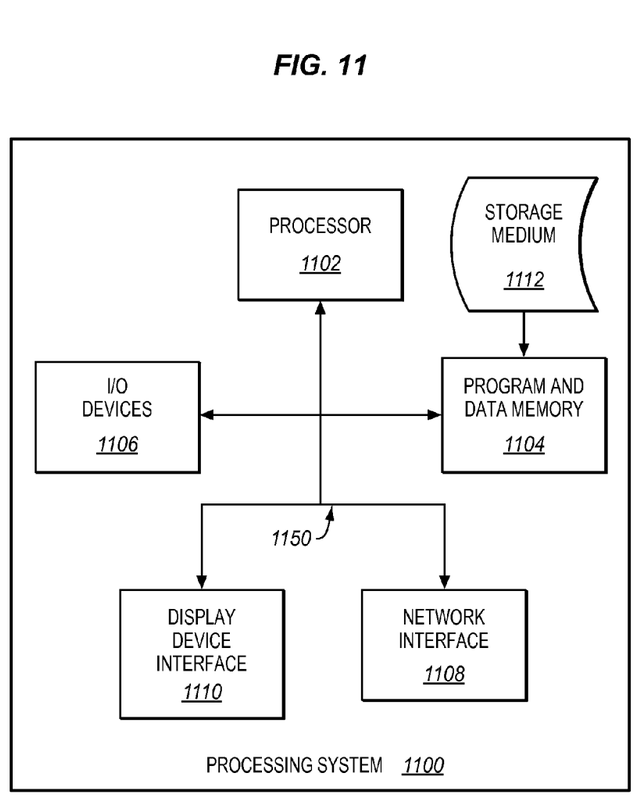
FIG. 11 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 11 illustrates a processing system 1100 operable to execute a computer readable medium embodying programmed instructions to perform desired functions in an exemplary embodiment. Processing system 1100 is operable to perform the above operations by executing programmed instructions tangibly embodied on computer readable storage medium 1112. In this regard, embodiments of the invention can take the form of a computer program accessible via computer-readable medium 1112 providing program code for use by a computer or any other instruction execution system. For the purposes of this description, computer readable storage medium 1112 can be anything that can contain or store the program for use by the computer.

Computer readable storage medium 1112 can be an electronic, magnetic, optical, electromagnetic, infrared, or semiconductor device. Examples of computer readable storage medium 1112 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1100, being suitable for storing and/or executing the program code, includes at least one processor 1102 coupled to program and data memory 1104 through a system bus 1150. Program and data memory 1104 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1106 (including but not limited to keyboards, displays, pointing devices, etc.) can be coupled either directly or through intervening I/O controllers. Network adapter interfaces 1108 may also be integrated with the system to enable processing system 1100 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1110 may be integrated with the system to interface to one or more display devices, such as printing systems and screens for presentation of data generated by processor 1102.

Although specific embodiments were described herein, the scope of the invention is not limited to those specific embodiments. The scope of the invention is defined by the following claims and any equivalents thereof.

I claim:
1. A system comprising:
a Print Verification System (PVS) comprising:
an imaging device configured to image pages of physical print media that have been marked by a printer for a print job;
an interface configured to receive rasterized pages representing the pages of physical print media; and
a controller configured to correlate images of the physical pages with the rasterized logical pages, and to identify discrepancies between images of physical pages and correlated rasterized logical pages,
the controller is configured to identify a first mark on an image of a physical page that flags the page for special processing at the PVS, to identify, in response to identifying the first mark, a second mark on the image that indicates a type of special processing for the page at the PVS, and to perform the indicated type of special processing upon the page at the PVS in response to identifying the second mark.
2. The system of claim 1, wherein:
the second mark directs the PVS to forego identifying discrepancies for the page.
3. The system of claim 1, wherein:
the first mark comprises a document number that exceeds the number of documents within the print job.

4. The system of claim 1, wherein:
the controller is configured to identify a range of document numbers for the print job, and to identify the first mark based on the first mark indicating a document number outside of the range.

5. The system of claim 1, wherein:
the second mark comprises one of multiple page numbers, wherein each of the multiple page numbers, when considered in combination with the first mark, indicates a different type of special processing.

6. The system of claim 1, wherein:
the second mark directs the PVS to analyze the image of the page to calibrate alignment of a camera of the PVS.

7. The system of claim 1, wherein:
the first mark replaces a mark for a document number within the print job, and the second mark replaces a mark for a page number within the print job.

8. A system comprising:
a printer comprising:
  a marking engine that includes multiple printheads;
  an interface configured to receive print data for a print job;
  multiple Raster Image Processors (RIPs); and
  a print controller configured to identify pages of the print job for special processing at a downstream Print Verification System (PVS), to insert a first mark that flags an identified page for special processing at the PVS into print data defining the identified page, and to insert a second mark that indicates a type of special processing for the identified page at the PVS into the print data defining the identified page,
  the print controller is configured to transmit the print data for the job to the PVS, and to direct the printheads of the marking engine to mark physical pages of print media based on the print data, including the inserted first mark and second mark.

9. The system of claim 8, wherein:
the second mark directs the PVS to forego identifying discrepancies for the page.

10. The system of claim 8, wherein:
the first mark comprises a document number that exceeds the number of documents within the print job.

11. The system of claim 8, wherein:
the print controller is configured to identify a range of document numbers for the print job, and to insert the first mark as a document number outside of the range.

12. The system of claim 8, wherein:
the second mark comprises one of multiple page numbers, wherein each of the multiple page numbers, when considered in combination with the first mark, indicates a different type of special processing.

13. The system of claim 8, wherein:
the second mark directs the PVS to analyze the image of the page to calibrate alignment of a camera of the PVS.

14. The system of claim 8, wherein:
the controller is configured to insert the first mark and the second mark at page locations that will be cut from the print job.

15. A method comprising:
imaging, via an imaging device, pages of physical print media that have been received by a Print Verification System (PVS) after being marked by a printer for a print job;
receiving, via an interface, rasterized logical pages at the PVS representing the pages of physical print media;
correlating, via a controller, images of the physical pages with the rasterized logical pages;
identifying, via the controller discrepancies between images of physical pages and correlated rasterized logical pages;
identifying, via the controller, a first mark on an image of a physical page that flags the page for special processing at the PVS;
in response to identifying the first mark, identifying, via the controller, a second mark on the image that indicates a type of special processing for the page at the PVS; and
performing the indicated type of special processing upon the page at the PVS in response to identifying the second mark.

16. The method of claim 15, wherein:
the second mark directs the PVS to forego identifying discrepancies for the page.

17. The method of claim 15, wherein:
the first mark comprises a document number that exceeds the number of documents within the print job.

18. The method of claim 15, wherein:
the method further comprises identifying a range of document numbers for the print job; and
identifying the first mark based on the first mark indicating a document number outside of the range.

19. The method of claim 15, wherein:
the second mark comprises one of multiple page numbers, wherein each of the multiple page numbers, when considered in combination with the first mark, indicates a different type of special processing.

20. The method of claim 15, wherein:
the second mark directs the PVS to analyze the image of the page to calibrate alignment of a camera of the PVS.

* * * * *